(12) United States Patent
Miyabe

(10) Patent No.: US 10,382,338 B2
(45) Date of Patent: Aug. 13, 2019

(54) MITIGATION OF PROCESSING LOAD ON CONTROL DEVICE CONTROLLING TRANSFER DEVICES WITHIN NETWORK

(71) Applicant: FUJITSU LIMITED, Kawasaki-shi, Kanagawa (JP)

(72) Inventor: Masatake Miyabe, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 218 days.

(21) Appl. No.: 14/748,280

(22) Filed: Jun. 24, 2015

(65) Prior Publication Data

US 2016/0057063 A1    Feb. 25, 2016

(30) Foreign Application Priority Data

Aug. 22, 2014    (JP) .................. 2014-169558

(51) Int. Cl.
*G06F 15/16*    (2006.01)
*H04L 12/801*   (2013.01)
*H04L 12/841*   (2013.01)

(52) U.S. Cl.
CPC .............. *H04L 47/16* (2013.01); *H04L 47/28* (2013.01)

(58) Field of Classification Search
USPC ........................................................ 709/232
See application file for complete search history.

(56) References Cited

U.S. PATENT DOCUMENTS 6,091,951 A * 7/2000 Sturniolo .............. H04W 36/18
455/432.2
6,154,461 A * 11/2000 Sturniolo .............. H04W 36/18
370/338

(Continued)

FOREIGN PATENT DOCUMENTS

JP    2014075668 A  *  4/2014  ............ H04L 12/26
WO   2011/115168 A1    9/2011

OTHER PUBLICATIONS

Open Networking Foundation, OpenFlow Switch Specification Version 1.3.2 (Wire Protocol 0x04), [online] Apr. 25, 2013, Open Networking Foundation <https://www.opennetworking.org/images/stories/downloads/sdn-resources/onf-specifications/openflow/openflow-spec-v1.3.2.pdf>.

(Continued)

*Primary Examiner* — Alicia Baturay
(74) *Attorney, Agent, or Firm* — Fujitsu Patent Center

(57) ABSTRACT

A transfer device operates within a network including a plurality of transfer devices and a control device. The transfer device includes a processor and a network connecting device. The network connecting device receives a packet. When a packet received from any of the plurality of transfer devices does not satisfy a process condition notified from the control device, the processor performs control such that a request message is not transmitted until a specified time period elapses from reception of the received packet. The request message is a message for requesting the control device to notify the transfer device of a process applicable to the received packet. When process information, which is information representing the process applicable to the received packet, has been obtained by the time the specified time period elapses, the processor processes the received packet in accordance with the process information.

6 Claims, 19 Drawing Sheets

(56) References Cited

U.S. PATENT DOCUMENTS

| | | | | |
|---|---|---|---|---|
| 6,201,962 B1* | 3/2001 | Sturniolo | H04W 36/18 | 455/432.2 |
| 7,580,415 B2* | 8/2009 | Hudson | H04L 29/12 | 370/389 |
| 7,813,326 B1* | 10/2010 | Kelm | H04L 45/08 | 370/338 |
| 7,818,449 B2* | 10/2010 | Stahl | H04L 29/06 | 709/238 |
| 7,839,890 B1* | 11/2010 | Neitzel | H04L 29/06 | 370/229 |
| 8,146,081 B2* | 3/2012 | Mizuno | G06F 9/4881 | 718/1 |
| 8,457,012 B2* | 6/2013 | Endo | H04L 45/00 | 370/253 |
| 8,667,126 B2* | 3/2014 | Fried | H04L 12/6418 | 709/224 |
| 8,787,154 B1* | 7/2014 | Medved | H04L 45/64 | 370/225 |
| 8,813,074 B2* | 8/2014 | Raju | G06F 9/45558 | 718/1 |
| 8,817,794 B2* | 8/2014 | Takahashi | H04L 47/34 | 370/394 |
| 8,824,274 B1* | 9/2014 | Medved | H04L 41/12 | 370/217 |
| 8,995,272 B2* | 3/2015 | Agarwal | H04L 45/245 | 370/235 |
| 9,112,794 B2* | 8/2015 | Agarwal | H04L 45/24 | |
| 9,125,142 B2* | 9/2015 | Hirata | H04W 48/16 | |
| 9,130,869 B2* | 9/2015 | Manghirmalani | H04L 45/44 | |
| 9,172,550 B2* | 10/2015 | Kapur | H04L 12/1886 | |
| 9,203,342 B2* | 12/2015 | Rongve | G05B 23/0235 | |
| 9,219,621 B2* | 12/2015 | Fried | H04L 12/6418 | |
| 9,276,852 B2* | 3/2016 | Akiyoshi | H04L 49/3009 | |
| 9,350,607 B2* | 5/2016 | Agarwal | H04L 41/0816 | |
| 9,391,886 B2* | 7/2016 | Roper | H04L 45/70 | |
| 9,461,893 B2* | 10/2016 | Akiyoshi | H04L 43/08 | |
| 9,544,217 B2* | 1/2017 | Roper | H04L 45/02 | |
| 9,571,450 B2* | 2/2017 | Raju | G06F 9/45558 | |
| 9,705,781 B1* | 7/2017 | Medved | H04L 45/64 | |
| 9,722,926 B2* | 8/2017 | Phaal | H04L 47/12 | |
| 2010/0158033 A1* | 6/2010 | Miyabe | H04L 45/00 | 370/412 |
| 2011/0307628 A1* | 12/2011 | Chiba | H04L 49/355 | 709/241 |
| 2013/0088967 A1* | 4/2013 | Kusumoto | H04L 47/11 | 370/235 |
| 2013/0250799 A1* | 9/2013 | Ishii | H04L 45/745 | 370/252 |
| 2013/0266017 A1* | 10/2013 | Akiyoshi | H04L 47/18 | 370/392 |
| 2013/0297731 A1* | 11/2013 | Chan | H04L 29/06448 | 709/217 |
| 2014/0040459 A1* | 2/2014 | Agrawal | H04L 45/14 | 709/224 |
| 2014/0211795 A1* | 7/2014 | Chiba | H04L 49/253 | 370/389 |
| 2015/0043574 A1* | 2/2015 | Akiyoshi | H04L 45/38 | 370/389 |
| 2015/0256397 A1* | 9/2015 | Agarwal | H04L 41/12 | 370/254 |
| 2015/0281085 A1* | 10/2015 | Phaal | H04L 47/12 | 370/235 |
| 2015/0334032 A1* | 11/2015 | Aida | H04L 12/4641 | 370/392 |
| 2016/0157274 A1* | 6/2016 | Akiyoshi | H04W 88/16 | 370/254 |

OTHER PUBLICATIONS

IEEE Std 802.1AB, 2009AB™, IEEE Standard for Local and Metropolitan Area Networks—Station and Media Access Control Connectivity Discovery, [online] Sep. 17, 2009, IEEE Computer Society <URL: http://standards.ieee.org/getieee802/download/802.1AB-2009.pdf>.

JPOA—Japanese Office Action dated Mar. 13, 2018 for corresponding Japanese Patent Application No. 2014-169558, with machine translation of the Office Action.

* cited by examiner

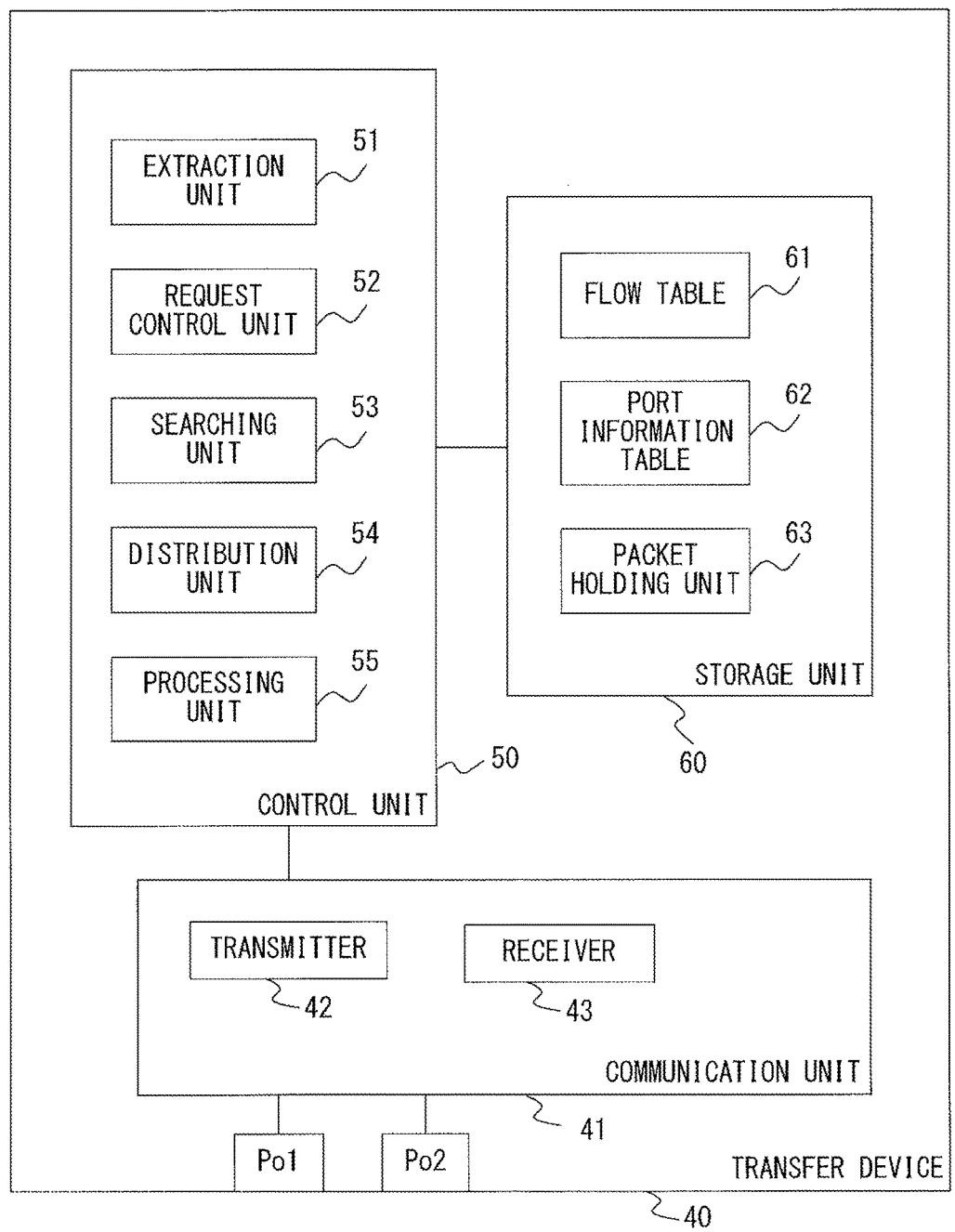
F I G. 4

| match | action |
|---|---|
| EtherType = 88CC | TRANSFER TO CONTROL DEVICE ALONG WITH RECEPTION PORT INFORMATION |

F I G. 7

| TRANSFER DEVICE | PORT NUMBER | DEVICE AT CONNECTION DESTINATION | PORT NUMBER OF CONNECTION DESTINATION |
|---|---|---|---|
| TRANSFER DEVICE 40a | A | — | — |
| | B | TRANSFER DEVICE 40b | C |
| | C | TRANSFER DEVICE 40a | B |
| TRANSFER DEVICE 40b | D | TRANSFER DEVICE 40c | E |
| | E | TRANSFER DEVICE 40b | D |
| TRANSFER DEVICE 40c | F | TRANSFER DEVICE 40d | G |
| TRANSFER DEVICE 40d | G | TRANSFER DEVICE 40c | F |
| | H | — | — |

FIG. 10

| PORT NUMBER | CONNECTION DESTINATION |
|---|---|
| A | UNKNOWN |
| B | TRANSFER DEVICE |

62a

| PORT NUMBER | CONNECTION DESTINATION |
|---|---|
| C | TRANSFER DEVICE |
| D | TRANSFER DEVICE |

62b

| PORT NUMBER | CONNECTION DESTINATION |
|---|---|
| E | TRANSFER DEVICE |
| F | TRANSFER DEVICE |

62c

| PORT NUMBER | CONNECTION DESTINATION |
|---|---|
| G | TRANSFER DEVICE |
| H | UNKNOWN |

| match | action |
|---|---|
| EtherType = 88CC | TRANSFER TO CONTROL DEVICE ALONG WITH RECEPTION PORT INFORMATION |
| MAC SA = COMMUNICATION DEVICE 2a<br>MAC DA = COMMUNICATION DEVICE 2b | to port B |

61b-1

| match | action |
|---|---|
| EtherType = 88CC | TRANSFER TO CONTROL DEVICE ALONG WITH RECEPTION PORT INFORMATION |
| MAC SA = COMMUNICATION DEVICE 2a<br>MAC DA = COMMUNICATION DEVICE 2b | to port D |

61c-1

| match | action |
|---|---|
| EtherType = 88CC | TRANSFER TO CONTROL DEVICE ALONG WITH RECEPTION PORT INFORMATION |
| | |

61d-1

| match | action |
|---|---|
| EtherType = 88CC | TRANSFER TO CONTROL DEVICE ALONG WITH RECEPTION PORT INFORMATION |
| MAC SA = COMMUNICATION DEVICE 2a<br>MAC DA = COMMUNICATION DEVICE 2b | to port H |

| match | action |
|---|---|
| EtherType = 88CC | TRANSFER TO CONTROL DEVICE ALONG WITH RECEPTION PORT INFORMATION |
| MAC SA = COMMUNICATION DEVICE 2a<br>MAC DA = COMMUNICATION DEVICE 2b | to port B |

61b-1

| match | action |
|---|---|
| EtherType = 88CC | TRANSFER TO CONTROL DEVICE ALONG WITH RECEPTION PORT INFORMATION |
| MAC SA = COMMUNICATION DEVICE 2a<br>MAC DA = COMMUNICATION DEVICE 2b | to port D |

61c-2

| match | action |
|---|---|
| EtherType = 88CC | TRANSFER TO CONTROL DEVICE ALONG WITH RECEPTION PORT INFORMATION |
| MAC SA = COMMUNICATION DEVICE 2a<br>MAC DA = COMMUNICATION DEVICE 2b | to port F |

61d-1

| match | action |
|---|---|
| EtherType = 88CC | TRANSFER TO CONTROL DEVICE ALONG WITH RECEPTION PORT INFORMATIO |
| MAC SA = COMMUNICATION DEVICE 2a<br>MAC DA = COMMUNICATION DEVICE 2b | to port H |

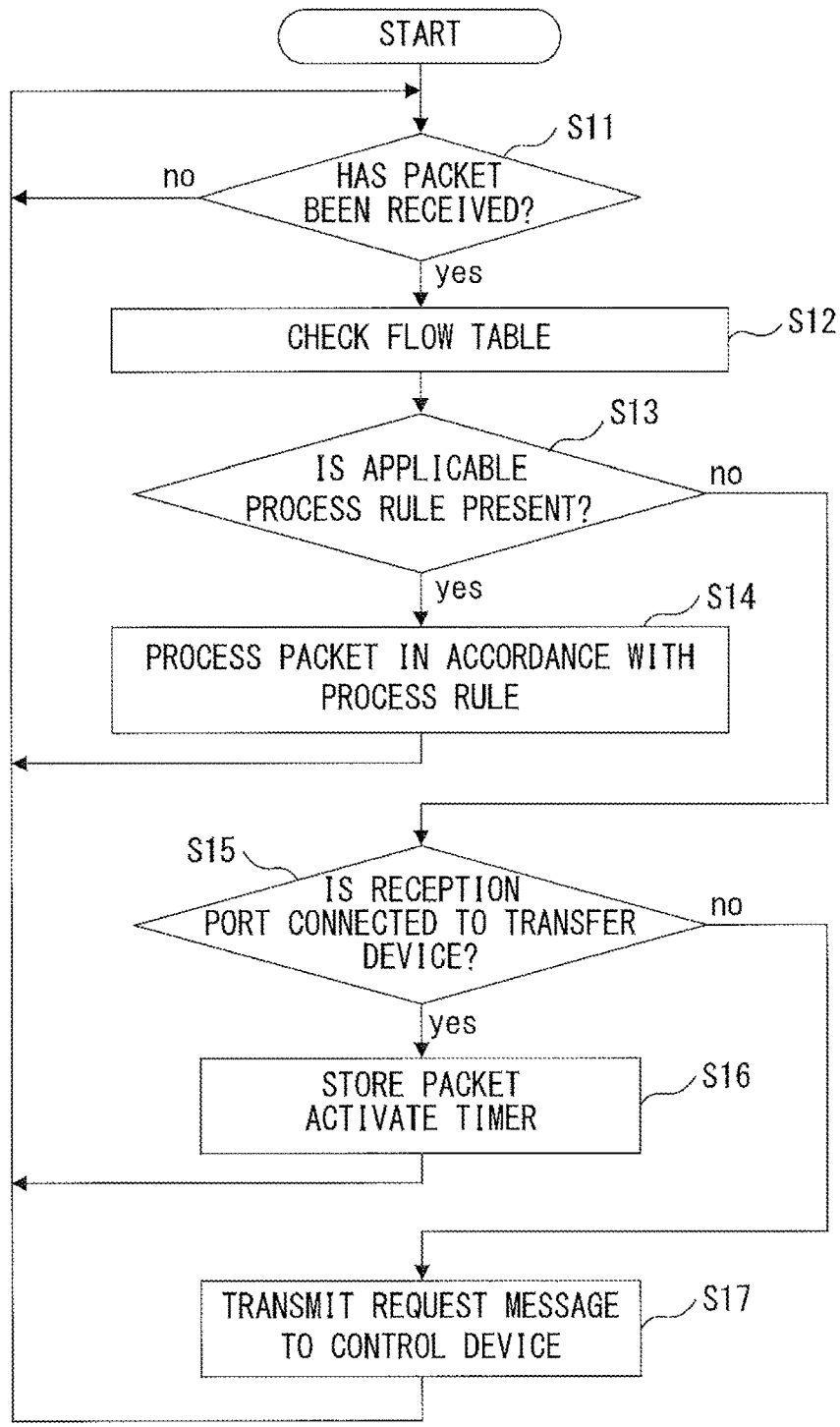
F I G. 1 7

MITIGATION OF PROCESSING LOAD ON CONTROL DEVICE CONTROLLING TRANSFER DEVICES WITHIN NETWORK

CROSS-REFERENCE TO RELATED APPLICATION

This application is based upon and claims the benefit of priority of the prior Japanese Patent Application No. 2014-169558, filed on Aug. 22, 2014, the entire contents of which are incorporated herein by reference.

FIELD

The embodiments discussed herein are related to communication within a network that includes transfer devices and a control device.

BACKGROUND

In recent years, attention has focused on a virtual network using software, and Software Defined Networking (SDN), which is a technique used to form a virtual network. Attention has also focused on a protocol such as OpenFlow or the like in order to form a virtual network. With SDN, a control device called a controller manages devices included in a network.

FIG. 1 illustrates an example of a control process in a network. The network illustrated in FIG. 1 includes one controller (OpenFlow controller) 5, and four switches (OpenFlow Switches) SW1 to SW4 managed by the controller 5. Moreover, a communication device 2a is connected to the switch SW1, while a communication device 2b is connected to the switch SW4. It is assumed that the OpenFlow protocol is used in the network illustrated in FIG. 1. Hereinafter, it is assumed that a process for communication between the communication device 2a and the communication device 2b is set in none of the switches SW1 to SW4 although the communication device 2a has transmitted a packet P1 to the communication device 2b.

As indicated by an arrow A1, the packet P1 transmitted from the communication device 2a reaches the switch SW1. The switch SW1 makes an inquiry about a process of the packet P1 to the controller 5 by transmitting a control message including the packet P1 to the controller 5 (arrow A2). The controller 5 decides a transfer path of the packet P1 by using a topology of the network, and notifies the switches SW1 to SW3 that transfer the packet P1 of an output port of the packet P1 addressed from the communication device 2a to the communication device 2b (arrow A3). Since the switch SW4 is connected to the communication device 2b, which is a destination of the packet P1, the controller 5 also transfers the packet P1 to be output to the switch SW4 when the controller 5 notifies the switch SW4 of the output port (arrow A4). The switches SW1 to SW4 store the information notified from the controller 5. Additionally, the switch SW4 transmits the packet P1 to the communication device 2b by outputting the packet P1 from the output port designated from the controller 5 (arrow A5). Next, when the communication device 2a has transmitted a packet P2 addressed to the communication device 2b, the switches SW1 to SW4 transfer the packet P2 by using the information notified in the arrows A3 and A4. Accordingly, the packet P2 is transferred to the communication device 2b via the switches SW1 to SW4 (arrow A6).

As described above, the switches managed by the controller 5 process a packet by using information obtained from the controller 5, and makes an inquiry to the controller 5 about a process for a packet for which a process target is not notified. Meanwhile, the controller 5 notifies a switch, which processes a packet that is inquired about, of content of the process for the packet.

As a technique related to management of a network, a technique such as LLDP (Link Layer Discovery Protocol) or the like is sometimes used to identify a connection relationship between devices included in the network.

The following documents are known as related techniques.

[Non-patent Document 1] "OpenFlow Switch Specification Version 1.3.2", [online], Apr. 25, 2013, Open Networking Foundation <https://www.opennetworking.org/images/stories/downloads/sdn-resources/onf-specifications/openflow/openflow-spec-v1.3.2.pdf>

[Non-patent Document 2] IEEE Std 802.1AB, IEEE Standard for Local and Metropolitan Area Networks: Station and Media Access Control Connectivity Discovery, [online], Sep. 17, 2009, IEEE Computer Society <URL: http://standards.ieee.org/getieee802/download/802.1AB-2009.pdf>

The controller (control device) notifies all the switches that process a packet, for which a processing method is inquired about, of information for identifying the processing method. However, when a considerable amount of time is used for communication between the controller and some of the switches due to congestion or the like within the network, some of the switches receive the packet to be processed earlier than information from the controller in some cases. In this case, the switches make an inquiry to the controller about the process of the received packet. Therefore, the controller again executes processes such as calculation of a transfer path, and settings of a switch for the same packet, so that a processing load on the controller becomes heavy. Also, when a protocol other than OpenFlow described in BACKGROUND is used, a similar problem can occur in a network where a control plane and a data plane are separate.

SUMMARY

According to an aspect of the embodiments, a transfer device operates in a network including a plurality of transfer devices and a control device. The transfer device includes a processor and a network connecting device. The network connecting device receives a packet. When a packet received from any of the plurality of transfer devices does not satisfy a process condition notified from the control device, the processor performs control such that a request message is not transmitted until a specified time period elapses from reception of the packet. The request message is a message for requesting the control device to notify the transfer device of a process applicable to the received packet. When process information, which is information representing the process applicable to the received packet, has been obtained by the time the specified time period elapses, the processor processes the received packet in accordance with the process information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 illustrates an example of a configuration of a transfer device.

FIG. 7 illustrates an example of a flow table.

FIG. 10 illustrates an example of a topology table.

FIG. 12 illustrates an example of a port information table.

FIG. 14 illustrates examples of the flow table.

FIG. 16 illustrates examples of the flow table.

FIG. 17 is a flowchart for explaining an example of a process executed by the transfer device.

DESCRIPTION OF EMBODIMENTS

Figure 1:
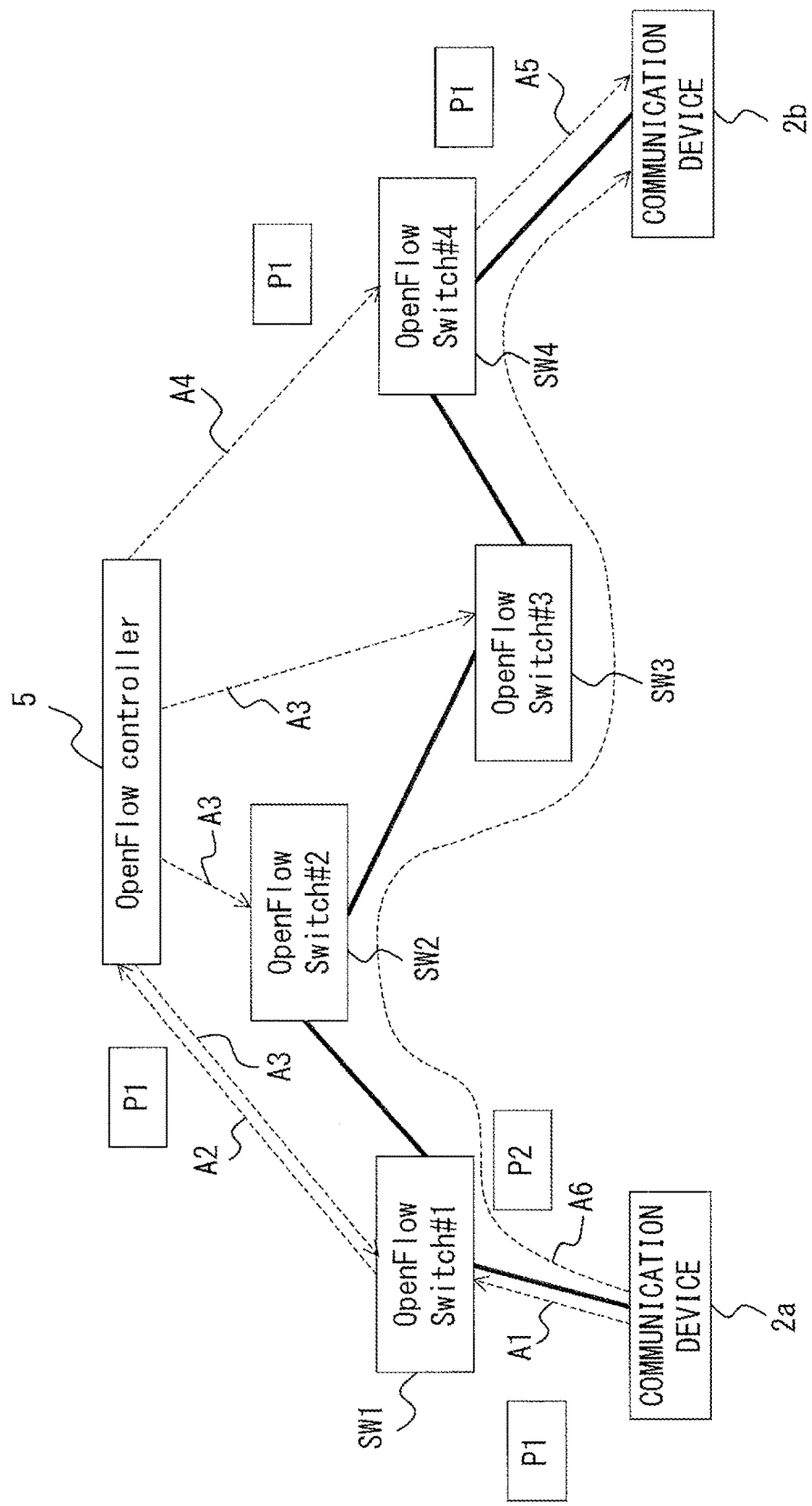
FIG. 1 illustrates an example of a control process in a network.
Figure 2:
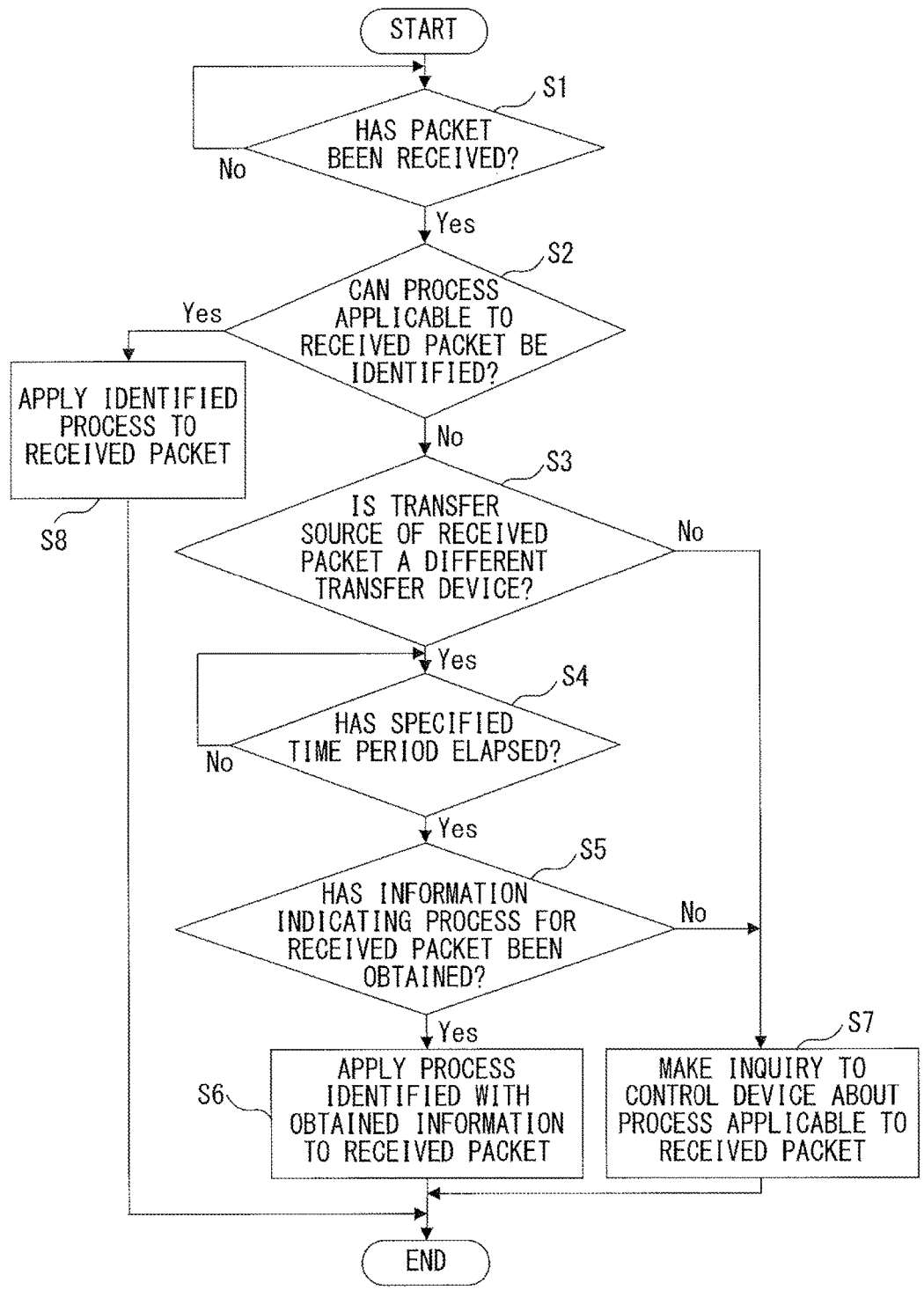
FIG. 2 is a flowchart for explaining an example of a process executed by a transfer device according to an embodiment.

FIG. 2 illustrates an example of a process executed when a transfer device according to an embodiment has received a packet. The transfer device can operate as a switch in SDN, and processes a packet in accordance with information obtained from a control device. The transfer device can be controlled in accordance with an arbitrary protocol, such as OpenFlow or the like, for implementing SDN.

The transfer device waits ("NO" in step S1) until it receives a packet. Upon receipt of a packet, the transfer device determines whether a process applicable to the received packet can be identified in accordance with information already notified from the control device ("YES" in step S1; step S2). When the transfer device is unable to identify the process applicable to the received packet, it determines whether a transfer source of the received packet is a different transfer device ("NO" in step S2; step S3). When the transfer source of the received packet is a different transfer device, the transfer device determines that the control device has already executed the process for the received packet at least once ("YES" in step S3). This is because the different transfer device recognizes the process for the received packet. Moreover, the control device is expected to have notified all the transfer devices, which process the packet to be processed, of the process for the packet. Accordingly, the transfer device determines that the process for the received packet can possibly be notified from the control device, and waits until a specified time period elapses without making an inquiry to the control device (step S4). Thereafter, the transfer device determines whether it has obtained information indicating the process for the received packet during the waiting time period ("YES" in step S4; step S5). When the transfer device has obtained the information indicating the process for the received packet during the waiting time period, it processes the received packet by applying the obtained information to the received packet ("YES" in step S5; step S6).

Alternatively, when the transfer device has not obtained the information indicating the process for the received packet during the waiting time period, it makes an inquiry to the control device about the process applicable to the received packet ("NO" in step S5; step S7).

When the transfer device determines, in step S3, that the received packet has not been received from a different transfer device, it determines that none of the transfer devices made an inquiry to the control device about the process for the received packet. In this case, the transfer device makes an inquiry to the control device about the process applicable to the received packet (step S7). Moreover, when the transfer device identifies the process applicable to the received packet in step S2 by using information stored in the local transfer device, it applies the identified process to the received packet (step S8).

As described above, when the transfer device according to the embodiment has received, from a different transfer device, a packet for which process content is not notified, it can possibly receive a notification from the control device. Therefore, the transfer device does not make an inquiry to the control device about a process for the received packet until a specified time period elapses. Moreover, when the transfer device is able to obtain the notification of the process for the received packet during the waiting time period, it processes the received packet without making an inquiry to the control device. Accordingly, even though congestion occurs on a communication path between the control device and the transfer device, there is a small possibility that a request for a process is redundantly issued for a packet for which the control device has already performed processes such as calculation of a path, and the like. Therefore, the processing load on the control device can be lightened.

Additionally, with a method according to an embodiment, the transfer device does not make an inquiry about content of a process to the control device, so that the numbers of transmitted and received packets can be reduced, and also congestion within the network can be prevented from becoming worse. That is to say, if a transmission delay caused by a notification of content of a process from the control device to the transfer device is large, congestion that occurs within the network can possibly become worse when the transfer device transmits a request to the control device for notification of the process. Moreover, the control device performs communication for notifying a subordinate transfer device of the decided content of the process. Therefore, a response from the control device can also possibly make the congestion within the network worse. Accordingly, the transfer device according to the embodiment waits until it receives a packet including the content of the process, and does not make the congestion within the network worse by executing the process with the use of information received during the waiting time period.

For ease of understanding, FIG. 2 illustrates, as an example, a case where the transfer device does not execute the process until a specified waiting time period elapses as illustrated in step S4, S5. However, the transfer device can also stop waiting at a point in time when it receives information indicating the process.

<Device Configuration>

Figure 3:
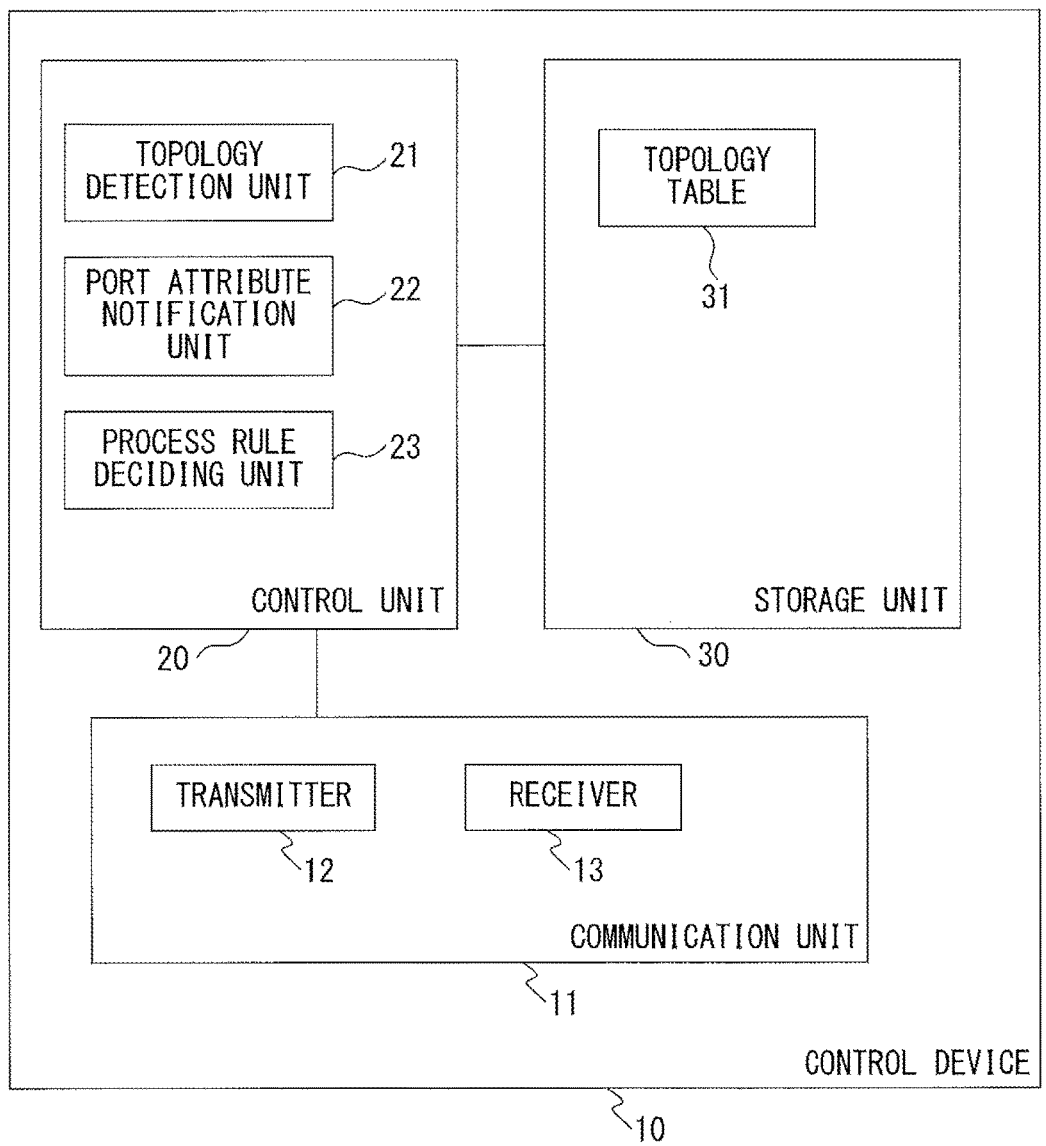
FIG. 3 illustrates an example of a configuration of a control device.

FIG. 3 illustrates an example of a configuration of the control device 10. It is assumed that the control device 10 can operate as a controller in SDN, and makes a decision and a notification of content of a process of a packet. The control device 10 includes a communication unit 11, a control unit 20 and a storage unit 30. The communication unit 11 includes a transmitter 12 and a receiver 13. The control unit 20 includes a topology detection unit 21, a port attribute notification unit 22 and a process rule decision unit 23. The storage unit 30 stores information such as a topology table 31 and the like. The transmitter 12 transmits a control message to a transfer device within the network. The receiver 13 receives, from a transfer device within the network, a request message for requesting the control device to notify the transfer device of a process of a packet.

The topology detection unit 21 transmits, via the transmitter 12, a control message for causing a transfer device to transmit an LLDP packet. Moreover, the topology detection unit 21 identifies a topology within the network by using a control message obtained via the receiver 13. The topology detection unit 21 stores the identified topology as the topology table 31 in the storage unit 30. The port attribute notification unit 22 identifies whether each port of a transfer device is connected to a different transfer device (a port attribute) by using the topology table 31, and notifies the transfer device of a result of the identification.

The process rule decision unit 23 decides content of a process for a packet, about which an inquiry is made with the request message received from a transfer device, by using the topology table 31 and the like. Hereinafter, content of a process of a packet is sometimes referred to as a "process rule". The "process rule" is arbitrary data that represents a processing method of a packet. For example, the process rule may be information that makes an association between a destination Media Access Control (MAC) address of a packet and a number of an output port that the transfer device uses to transfer the packet.

FIG. 4 illustrates an example of a configuration of the transfer device 40. The transfer device 40 includes a communication unit 41, a control unit 50 and a storage unit 60. Moreover, the transfer device 40 is provided with an arbitrary number of ports. FIG. 4 illustrates the transfer device 40 provided with a port Po1 and a port Po2 as an example. The communication unit 41 includes a transmitter 42 and a receiver 43. The control unit 50 includes an extraction unit 51, a request control unit 52, a searching unit 53, a distribution unit 54 and a processing unit 55. The storage unit 60 stores information such as a flow table 61, a port information table 62 and the like, and includes a packet holding unit 63.

The transmitter 42 transmits a packet to a different transfer device or a communication device 2, and also transmits a control message to the control device 10. The receiver 43 receives a packet from a different transfer device or a communication device 2, and also receives a control message from the control device 10. The receiver 43 outputs the received packet or control message to the distribution unit 54. The distribution unit 54 distributes the packet or the control message in accordance with a type of the packet or the control message.

The extraction unit 51 obtains information indicating whether each port is connected to a different transfer device from the control message received from the control device 10, and records the obtained information in the port information table 62. The request control unit 52 executes processes for obtaining a process rule, such as generation of a request message for requesting a process rule of a packet for which the process rule is not included in the flow table 61. It is assumed that the request control unit 52 can use the port information table 62 when needed in order to determine whether the request message is to be generated. The searching unit 53 searches the flow table 61 for a process rule applicable to a packet received from a device other than the control device 10. The processing unit 55 processes the packet by using the process rule identified by the searching unit 53.

The flow table 61 records the process rule of the packet transferred to the transfer device 40. The packet holding unit 63 holds a packet received from a different transfer device among packets, for which a process rule is not identified by the searching unit 53, during a time period equal to or shorter than a specified waiting time period.

Figure 5:
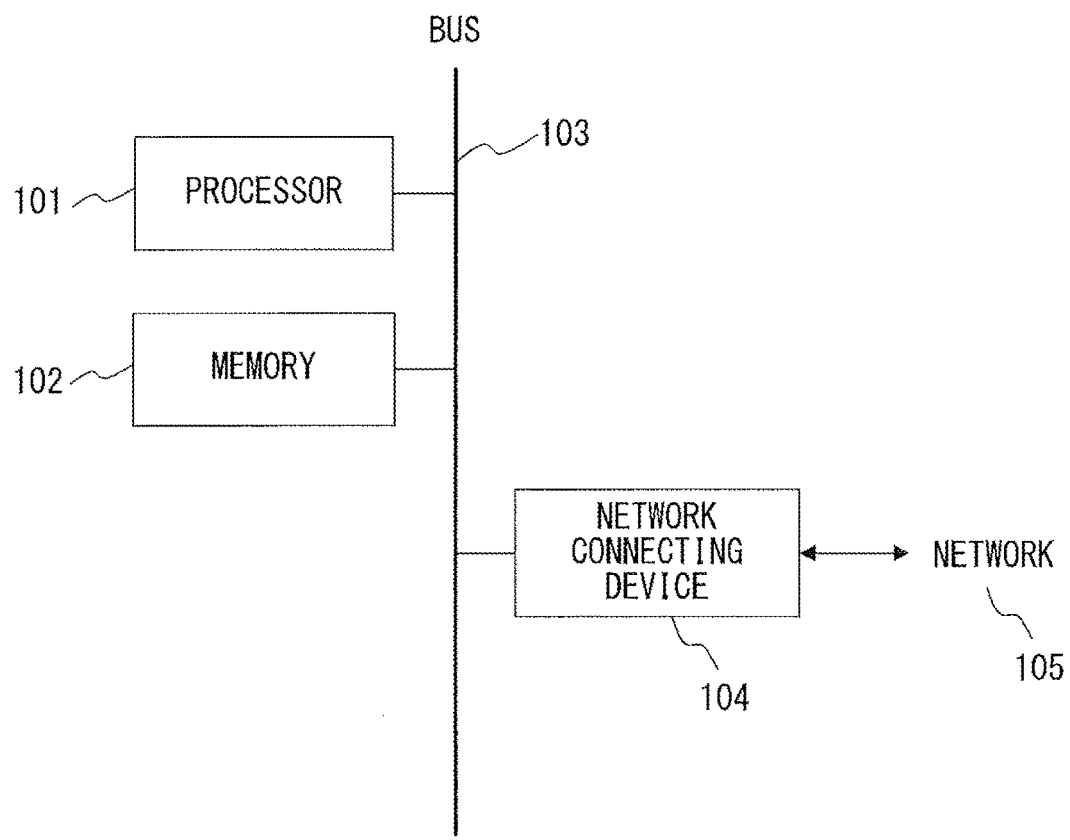
FIG. 5 illustrates an example of a hardware configuration of the transfer device and the control device.

FIG. 5 illustrates an example of a hardware configuration of the control device 10 and the transfer device 40. The control device 10 and the transfer device 40 respectively include a processor 101, a memory 102, a bus 103 and a network connecting device 104. The bus 103 interconnects the processor 101, the memory 102 and the network connecting device 104 so that they can mutually transmit and receive data. The network connecting device 104 communicates with a network 105.

In the control device 10, the processor 101 operates as the control unit 20, and the memory 102 operates as the storage unit 30. The network connecting device 104 implements the communication unit 11. In the transfer device 40, the processor 101 implements the control unit 50. The memory 102 operates as the storage unit 60. The network connecting device 104 includes ports, and operates as the communication unit 41.

First Embodiment

A first embodiment is described below by separating the embodiment into identification of a network topology in the control device 10, an update of the port information table 62 in the transfer device 40, and a process of a packet using a process rule notified from the control device 10. For ease of identification of a device that is executing a process, an alphabetical letter assigned to an operating transfer device 40 is sometimes appended to a reference numeral in the following description. For example, the request control unit 52a indicates the request control unit 52 included in the transfer device 40a. It is assumed that the distribution unit 54 outputs a packet received from a device other than the control device 10 to the searching unit 53 in all the transfer devices 40. It is further assumed that a control message including a process rule, a control message that notifies an attribute of a port, and other control messages, are output to the request control unit 52, the extraction unit 51 and the processing unit 55, respectively.

(1) Identification of Network Topology in Control Device 10

Figure 6:
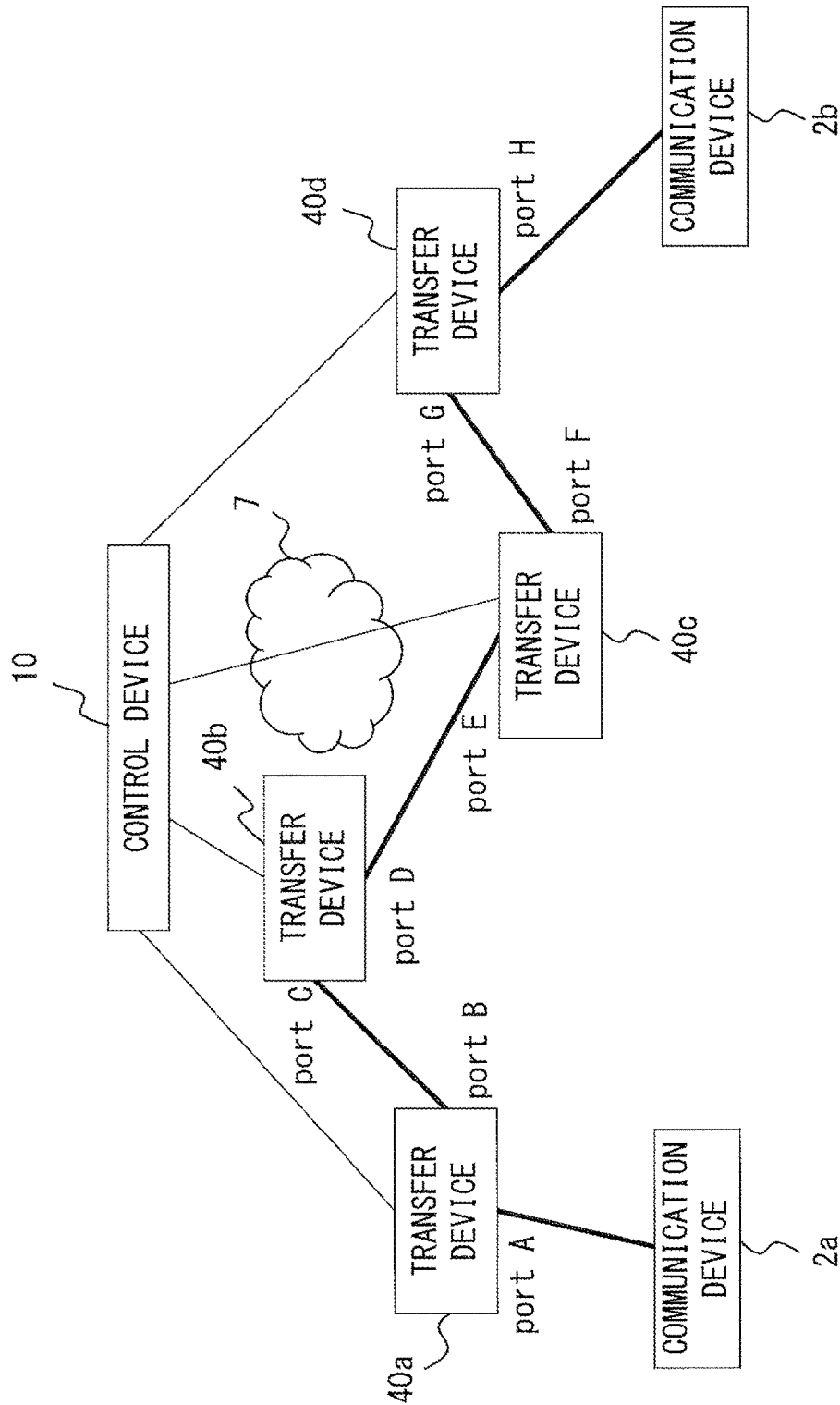
FIG. 6 illustrates an example of a network.

FIG. 6 illustrates an example of the network. The network illustrated in FIG. 6 includes the control device 10, transfer devices 40a to 40d, and communication devices 2a, 2b. Here, it is assumed that all the transfer devices 40a to 40d are managed by the control device 10. It is also assumed that a communication path between the control device 10 and the transfer device 40c includes a congested point 7. In FIG. 6, a port number of a port of each of the transfer devices 40 is depicted in the neighborhood of the corresponding port.

When the control device 10 and the transfer device 40 are connected, the process rule decision unit 23 transmits, to the transfer device 40 at a connection destination, a control message including a process rule indicating that a packet used to detect a topology is to be transmitted to the control device 10. For example, when the request control unit 52*b* of the transfer device 40*b* has obtained the control message via the receiver 43*b* and the distribution unit 54*b*, it records the process rule notified with the control message in the flow table 61*b*.

FIG. 7 illustrates an example of the flow table 61*b*. In the flow table 61, each of an arbitrary number of process rules is recorded as a combination of a match condition and an action. Here, the match condition indicates a condition of a packet input to the transfer device 40, and the action indicates a process that the processing unit 55 executes for a packet selected by using the match condition. Accordingly, it can be said that the match condition is a selection condition notified from the control device as a condition for selecting a packet to be processed.

Figure 9:
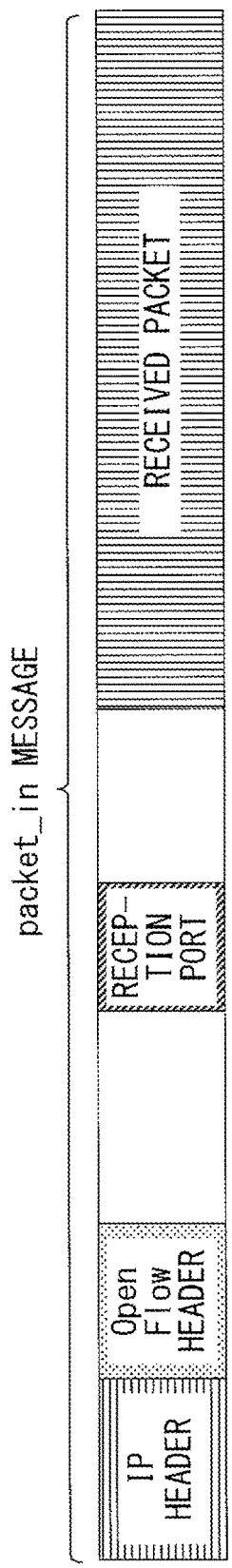
FIG. 9 illustrates an example of a control message transmitted from the transfer device to the control device.

In the flow table 61*b* illustrated in FIG. 7, information is recorded indicating that a packet set to Ethertype=88CC is transferred to the control device 10 along with information (reception port information) indicating a reception port number of the packet. Here, the packet set to Ethertype=88CC is an LLDP packet. That is to say, it is recorded in the flow table 61*b* that, upon receipt of an LLDP packet, a reception port number of the LLDP packet and the LLDP packet are transmitted to the control device 10. Accordingly, for example, when the transfer device 40*b* receives an LLDP packet, it can transmit the LLDP packet to the control device 10 along with information of a reception port of the LLDP packet by using a Packet_In message. The Packet-In message will be described later (FIG. 9).

Also, the transfer devices 40*a*, 40*c* and 40*d* receive a control message similar to that of the transfer device 40*b*, and record a process rule within the control message in the flow table 61. Accordingly, it is assumed that the flow table 61 at a point in time when a connection is established with the control device 10 is as illustrated in FIG. 7 in all the transfer devices 40*a* to 40*d*.

Figure 8:
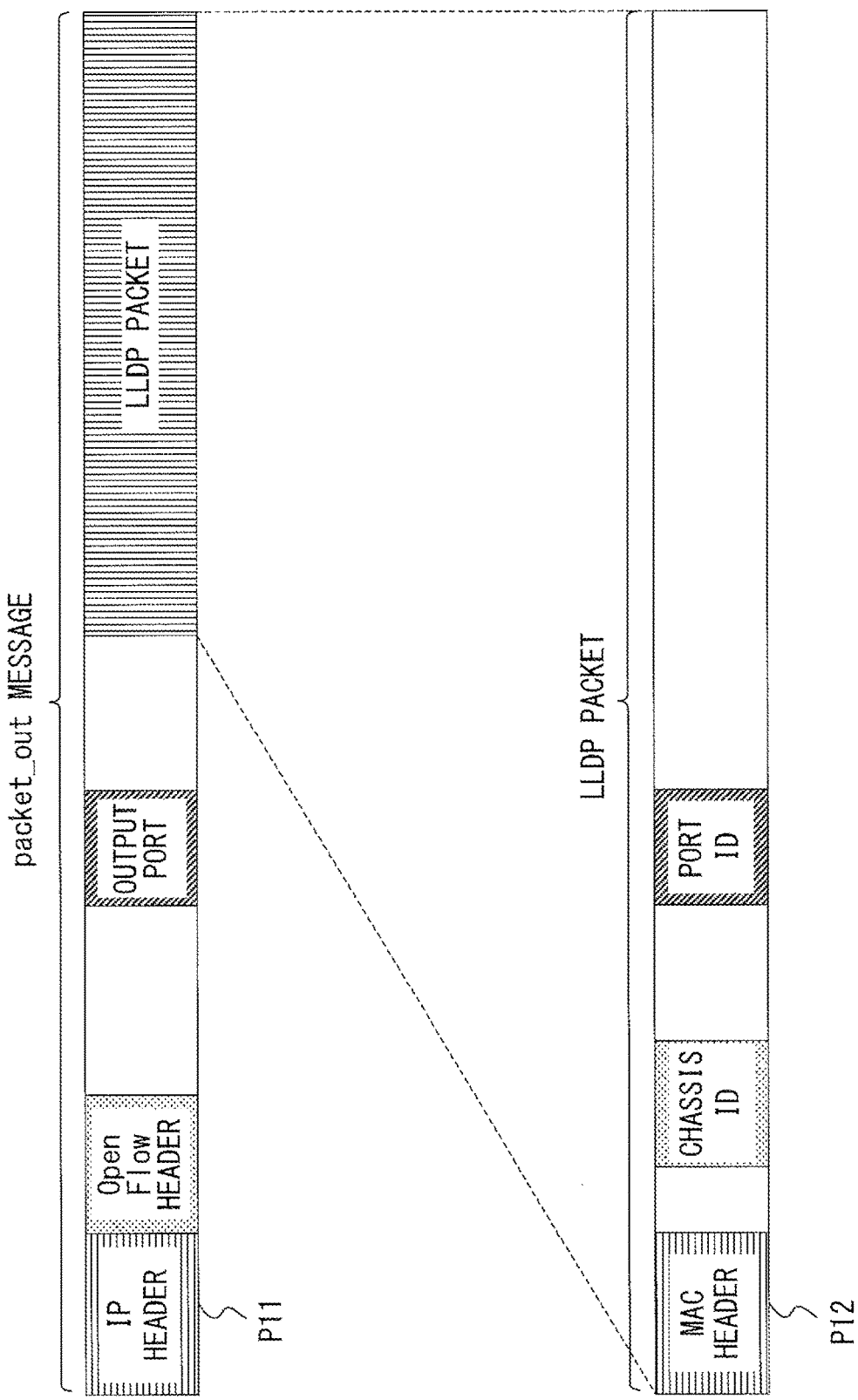
FIG. 8 illustrates an example of a control message that the control device transmits to identify a topology.

P11 illustrated in FIG. 8 is an example of a control message that the control device 10 transmits to identify a topology. The control message includes an LLDP packet that the transfer device 40 at a destination of the control message is requested to transfer, and information about a transmission port of the LLDP packet. In the example illustrated in FIG. 8, the control message is a Packet_Out message for issuing a request to transmit an LLDP packet. The Packet_Out message includes an IP (Internet Protocol) header, an OpenFlow header, an output port, and an LLDP packet. The IP header includes, as a destination, an IP address of the transfer device 40 at a transmission destination of the Packet_Out message. A message type within the OpenFlow header includes information indicating that the control message is a Packet_Out message. The output port indicates a number of a port that the transfer device 40 uses as a transmission port when it transmits an LLDP packet.

P12 illustrated in FIG. 8 is an LLDP packet included in the control message depicted in the packet P11. The LLDP packet includes a MAC (Media Access Control) header, a chassis ID and a port ID. In the MAC header, information (Ethertype=88CC) indicating that the control packet is an LLDP packet is recorded. The chassis ID is information for identifying the transfer device 40 at a destination of the control message. The port ID is a number of a port that the transfer device 40 at a destination of the control message uses to transmit an LLDP packet. As the port ID, a value identical to that of an output port field within the Packet_Out message is set. Assume that the control device 10 transmits a control message including the following information to the transfer device 40*a*.

Destination IP address: address of transfer device 40*a*
Message type: Packet_Out
Output port information: port B
Chassis ID within LLDP packet: transfer device 40*a*
Port ID within LLDP packet: port B The processing unit 55*a* of the transfer device 40*a* obtains the Packet_Out message via the receiver 43*a* and the distribution unit 54*a*. The processing unit 55*a* sets, to port B, an output port of the LLDP packet included in the Packet_Out message, and outputs the packet to the transmitter 42*a*. The transmitter 42*a* transmits the input LLDP packet from port B.

In the network illustrated in FIG. 6, when the transfer device 40*a* transmits an LLDP packet from port B, the packet is transmitted to the transfer device 40*b*. The receiver 43*b* of the transfer device 40*b* receives, via port C, the LLDP packet in which a chassis ID and a port ID are respectively set to the transfer device 40*a* and port B. The distribution unit 54*b* outputs the LLDP packet to the searching unit 53*b*. The searching unit 53*b* searches the flow table 61*b* for a process rule applicable to the input packet. Here, the flow table 61*b* is as illustrated in FIG. 7. Therefore, a request to notify the control device 10 of the LLDP packet along with information indicating the reception port occurs. Accordingly, the searching unit 53*b* generates a Packet_In message.

FIG. 9 illustrates an example of the Packet_In message transmitted from the transfer device to the control device. The Packet_In message includes an IP header, an OpenFlow header, information of a reception port of a packet, and a packet that the transfer device 40 at a transmission source of the Packet_In message has received. Here, the searching unit 53*b* incorporates the LLDP packet into the Packet_In message as a received packet. Note that information within the LLDP packet can be incorporated into the Packet_In message without being changed. Accordingly, the Packet_In message generated by the searching unit 53*b* includes the following information.

Transmission source IP address: address of transfer device 40*b*
Destination IP address: address of control device 10
Message type: Packet_In
Reception port information: port C
Chassis ID within LLDP packet: transfer device 40*a*
Port ID within LLDP packet: port B The topology detection unit 21 of the control device 10 determines that the transmission source of the Packet_In message including the LLDP packet is the transfer device 40 that has received the LLDP packet. Moreover, the topology detection unit 21 identifies the port at which the LLDP packet has been received in accordance with the reception port information field within the Packet_In message. Accordingly, the topology detection unit 21 identifies that the LLDP packet has been received at port C of the transfer device 40*b*. Moreover, the LLDP packet has been transmitted from the device identified with the chassis ID via the port identified with the port ID. In this example, the LLDP packet is transmitted from port B of the transfer device 40*a*.

That is to say, the topology detection unit 21 can determine that the port identified with the value of the reception port information field of the device at the transmission source of the Packet_In message is connected to a port of the device identified within the LLDP packet included in the message. The topology detection unit 21 records the obtained information in the topology table 31.

FIG. 10 illustrates an example of the topology table. Information obtained in the example described with reference to FIGS. 7 to 9 is recorded as indicated by the second entry of FIG. 10. The topology detection unit 21 obtains a device at a connection destination, and a port number of the connection destination, by executing a similar process for a port of each of the transfer devices 40. Accordingly, the topology detection unit 21 can obtain a connection relationship between ports by using an LLDP packet transmitted from a port that is a port of a transfer device and connected to a different transfer device.

Here, an LLDP packet is sometimes transmitted from a port that is not connected to a different transfer device among ports of a transfer device. The control device 10 does not notify devices other than transfer devices of a process rule. In this case, the transfer destination of the LLDP packet does not transmit, to the control device 10, a control message including the LLDP packet. Accordingly, when a Packet_In message is not received during a specified time period from the transmission of a Packet_Out message, the topology detection unit 21 determines that a port designated for the transmission destination of the LLDP packet is not connected to a transfer device. Assume that the control device 10 transmits a control message including the following information to the transfer device 40a.

Destination IP address: address of transfer device 40a
Message type: Packet_Out
Output port information: port A
Chassis ID within LLDP packet: transfer device 40a
Port ID within LLDP packet: port A As illustrated in FIG. 6, port A of the transfer device 40a is connected to the communication device 2a. Moreover, the control device 10 does not transmit and receive a control message to and from the communication device 2a. Accordingly, the topology detection unit 21 does not receive a Packet_In message including an LLDP that corresponds to chassis ID=transfer device 40a and port ID=port A. Therefore, the topology detection unit 21 determines that the device connected to port A of the transfer device 40a is not the transfer device 40, and records, in the topology table 31, information indicating that the connection destination of port A of the transfer device 40a is unknown. With the above described process, the topology detection unit 21 can obtain the topology table 31 illustrated in FIG. 10 in the network illustrated in FIG. 6.

(2) Update of Port Information Table 62 in Transfer Device 40

When the topology table 31 has been generated, the port attribute notification unit 22 notifies a transfer device 40, for which a connection is established, about whether a connection destination of a port provided in the transfer device 40 is a different transfer device.

Figure 11:
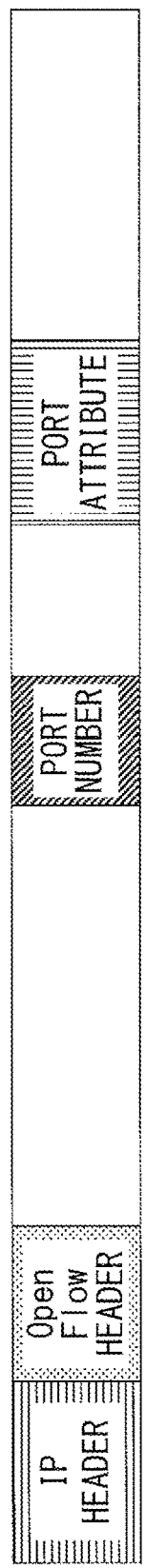
FIG. 11 illustrates an example of a port attribute setting message.

FIG. 11 illustrates an example of a port attribute setting message. The port attribute setting message includes an IP header, an OpenFlow header, a port number field and a port attribute field. As a destination IP address within the IP header, an address of a transfer device 40 including a port to be notified is set. In the OpenFlow header, information indicating that a message type is a port attribute setting message is incorporated. In the port number field, information of a port to which a notification about whether a connection destination is a different transfer device 40 is issued is stored. In the port attribute field, a value indicating whether the port identified with the value of the port number field is connected to the transfer device 40 is stored.

For example, when the port attribute notification unit 22 notifies the transfer device 40a of the attribute of port B, it identifies that port B is connected to port C of the transfer device 40b on the basis of the second entry of FIG. 10. Then, the port attribute notification unit 22 generates a port attribute setting message including the following information.

Destination IP address: transfer device 40a
Message type: port attribute setting message
Port number: port B
Port attribute: connection to a transfer device Meanwhile, when the port attribute notification unit 22 notifies the transfer device 40a of the attribute of port A, it identifies that the connection destination of port A is unknown on the basis of the first entry of FIG. 10. Then, the port attribute notification unit 22 generates a port attribute setting message including the following information Destination IP address: transfer device 40a
Message type: port attribute setting message
Port number: port A
Port attribute: connection destination unknown When the port attribute notification unit 22 has generated the port attribute setting message, it transmits the generated message to the transfer device 40 at the destination via the transmitter 12.

When the extraction unit 51a of the transfer device 40a has obtained the port attribute setting message via the receiver 43a and the distribution unit 54a, it extracts the information of the port attribute field, and the port number. The extraction unit 51a records, in the port information table 62a, the connection destination designated in the port attribute field in association with the port number.

FIG. 12 illustrates an example of the port information table 62. In the port information table 62a, information indicating that a connection destination of port A is unknown and port B is connected to a different transfer device is recorded by the extraction unit 51a.

The control device 10 notifies also a different transfer device 40 of a connection destination of each port by using a port attribute setting message, similarly to a notification to the transfer device 40a. Moreover, the transfer devices 40b to 40d execute a process that has been described with reference to FIGS. 11 and 12 and is similar to that of the transfer device 40a. Accordingly, the transfer device 40b holds the port information table 62b illustrated in FIG. 12, while the transfer device 40c holds the port information table 62c. Moreover, in the transfer device 40d, the port information table 62d illustrated in FIG. 12 is generated.

(3) Process of Packet Using Process Rule Notified from Control Device 10

Figure 13:
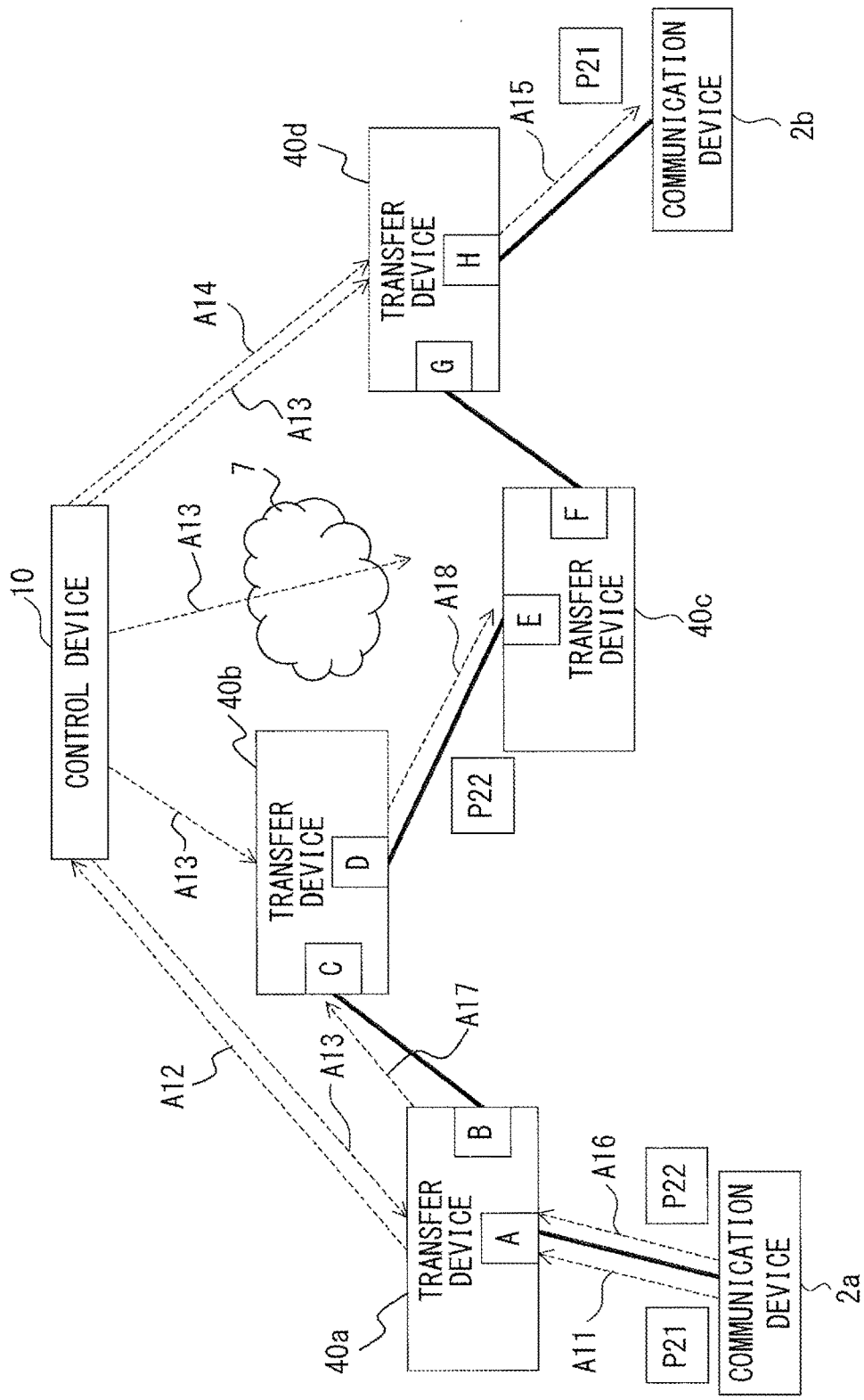
FIG. 13 is an explanatory diagram of control performed in a first embodiment.

FIG. 13 is an explanatory diagram of an example of control performed in the first embodiment. The process executed in a case where the port information table 62 held by the transfer devices 40a to 40d is as illustrated in FIG. 12 and the flow table 61 is as illustrated in FIG. 7 in all the transfer devices 40 is described below. In FIG. 13, each of the ports within each of the transfer devices 40 is enclosed by a square including a port number.

It is assumed that the communication device 2a transmits a packet P21 addressed to the communication device 2b in an arrow A11. The transfer device 40a receives the packet P21 via port A. It is assumed that the packet P21 is not an LLDP packet.

The searching unit 53a of the transfer device 40a obtains, via the receiver 43a and the distribution unit 54a, the packet P21 along with information indicating that the reception port is port A. The searching unit 53a identifies that a process rule applicable to the packet P21 is not included in the flow table 61a. The searching unit 53a outputs the packet P21 to the request control unit 52a along with the information indicating that the reception port is port A. When the packet is input from the searching unit 53a, the request control unit 52a determines that a packet to which the process rule is not applicable has been detected. The request control unit 52a determines whether the received packet has been transferred from a different transfer device by searching the port information table 62a, using the reception port number as a key. Port A is not connected to a transfer device as represented by the port information table 62a (FIG. 12). Therefore, the request control unit 52a decides to make an inquiry to the control device 10 about the process rule applicable to the packet P21. The request control unit 52a generates a Packet_In message including the packet P21, and transmits the generated message to the control device 10 via the transmitter 42a (arrow A12). The format of the Packet_In message is as illustrated in FIG. 9.

Upon receipt of the Packet_In message via the receiver 13, the process rule decision unit 23 of the control device 10 decides the process for the packet P21 by using the topology information (FIGS. 6 and 10) of the network. The process rule decision unit 23 decides to transmit the packet P21 sequentially to the transfer device 40a, the transfer device 40b, the transfer device 40c, the transfer device 40d and the communication device 2b, in this order.

Next, the process rule decision unit 23 of the control device 10 generates a process rule notification message addressed to each of the transfer devices 40a to 40d. Here, as the process rule notification message, for example, a Flow_Mod message of the OpenFlow protocol is applicable. The process rule notification message includes a condition (match condition) for identifying a packet addressed from the communication device 2a to the communication device 2b, and an output port number of a packet that satisfies the match condition in the transfer device 40 at a destination of the process rule notification message. For example, the transfer device 40a is notified, with the process rule notification message, that the packet addressed from the communication device 2a to the communication device 2b is output from port B.

As indicated by an arrow A13, the process rule decision unit 23 transmits the generated process rule notification message via the transmitter 12. It is assumed that the process rule notification message has reached the destination in a relatively short time from the transmission of the process rule notification message in each of the transfer devices 40a, 40b and 40d because a transmission delay with respect to the control device 10 is small. In contrast, it is assumed that a considerable amount of time is used until the transfer device 40c receives the process rule notification message transmitted from the control device 10 because the congested point 7 is included in the communication path between the transfer device 40c and the control device 10 as illustrated in FIG. 6.

FIG. 14 illustrates examples of the flow table 61. FIG. 14 illustrates examples of the flow table 61 held respectively by the transfer devices 40 at a point in time when the transfer devices 40a, 40b and 40d have received the process rule notification message and the transfer device 40c has not received the process rule notification message. The process executed when the flow table 61 is updated is described below.

Information indicating that a packet having a transmission source MAC address and a destination MAC address, which are respectively the address of the communication device 2a and that of the communication device 2b, is output from port B is assumed to be recorded in the process rule notification message addressed to the transfer device 40a. The request control unit 52a of the transfer device 40a obtains the process rule notification message via the receiver 43a and the distribution unit 54a. Then, the request control unit 52a adds, to the flow table, an action that outputs the packet to port B by making an association with the match condition in which the transmission source MAC address and the destination MAC address are respectively the address of the communication device 2a and that of the communication device 2b. Accordingly, the request control unit 52a updates the flow table 61a (FIG. 7) to the flow table 61a-1 (FIG. 14).

Similarly, assume that the following information is included in the process rule notification message addressed to the transfer device 40b.

Match Condition
Transmission source MAC address: communication device 2a
Destination MAC address: communication device 2b
Action: output to port D Similarly to the transfer device 40a, the process rule notification message is processed also in the transfer device 40b. Accordingly, the request control unit 52b updates the flow table 61b (FIG. 7) to the flow table 61b-1 (FIG. 14).

Additionally, when the following information is included in the process rule notification message addressed to the transfer device 40d, the request control unit 52d updates the flow table 61 (FIG. 7) to the flow table 61d-1 (FIG. 14).

Match Condition
Transmission source MAC address: communication device 2a
Destination MAC address: communication device 2b
Action: output to port H In contrast, the transfer device 40c has not received the process rule notification message transmitted from the control device 10. Therefore, the flow table 61 is not updated. Data within the flow table 61c-1 illustrated in FIG. 14 is identical to the flow table 61 illustrated in FIG. 7.

Additionally, the process rule decision unit 23 of the control device 10 transfers the packet P21 to the transfer device 40d so that the packet P21 can be transferred to the communication device 2b. At this time, the process rule decision unit 23 issues, to the transfer device 40d, a request to output the packet P21 from port H (arrow A14). The Packet_Out message indicated by P11 of FIG. 8As, for example, can be used as the control message transmitted in the arrow A14.

With the process of the arrow A14, the transfer device 40d outputs the packet P21 from port H in accordance with the control message upon receipt of the control message including the packet P21 (arrow A15). Thus, the packet P21 is transferred to the communication device 2b.

Next, it is assumed that the communication device 2a has transmitted a packet P22 addressed to the communication device 2b as indicated by an arrow A16. The transfer device 40a receives the packet P22. At this point in time, the transfer device 40a holds the flow table 61a-1 as described above with reference to FIG. 14. Accordingly, the searching unit 53a decides to output the packet P22 from port B by using information of the MAC header of the packet P22, and the flow table 61a-1. The processing unit 55a transmits the packet P22 via the transmitter 42a (arrow A17).

With the process indicated by an arrow A17, the transfer device 40b receives the packet P22. Procedures of the process executed by the transfer device 40b are similar to those of the process executed when the packet P22 is transferred in the transfer device 40a. Accordingly, the packet P22 is transferred to the transfer device 40c on the basis of the flow table 61b-1 (arrow A18).

The distribution unit 54c of the transfer device 40c outputs the packet P22 to the searching unit 53c along with information indicating that the reception port is port E. The searching unit 53c identifies that a process rule applicable to the packet P22 is not included in the flow table 61c-1. The searching unit 53c outputs the packet P22 to the request control unit 52c along with the information indicating that the reception port is port E. The request control unit 52c determines that the received packet has been transferred from a different transfer device by searching the port information table 62c (FIG. 12), using the reception port number as a key. The transfer of the packet from the different transfer device to the transfer device 40c means that the transfer device at the transfer source obtained the process rule for the packet from the control device 10. Moreover, when one packet is processed by a plurality of transfer devices 40, the control device 10 notifies all the transfer devices that execute the process of the process rule. Accordingly, the request control unit 52c determines that the process rule applicable to the packet P22 does not reach the transfer device 40c although the packet 22 has been transmitted from the control device 10. The request control unit 52c decides not to make an inquiry to the control device 10 until a specified time period elapses from the reception of the packet P22. The request control unit 52c causes the packet holding unit 63c to hold the packet P22.

Figure 15:
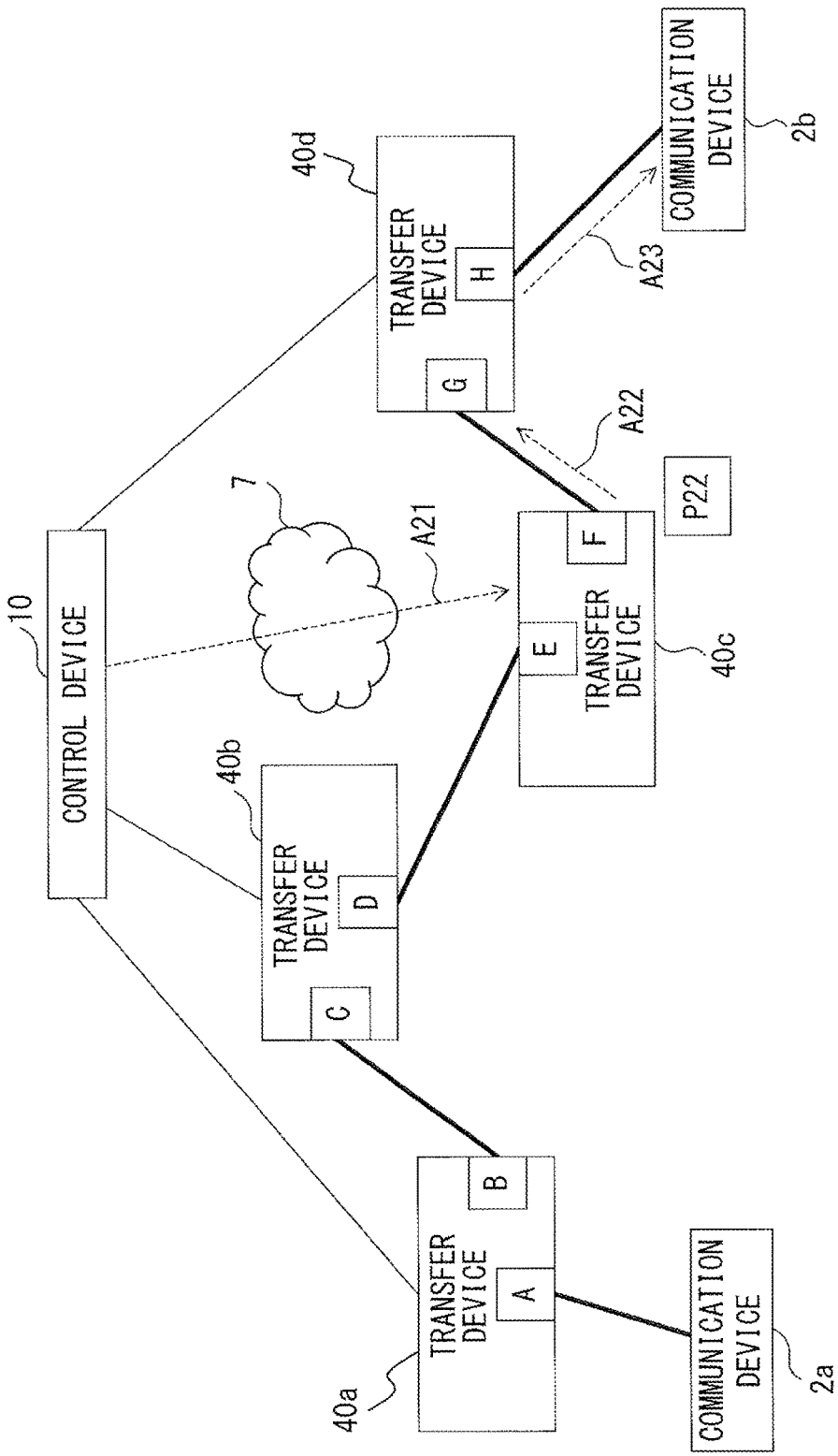
FIG. 15 is an explanatory diagram of an example of the control performed in the first embodiment.

FIG. 15 illustrates an example of a process executed after the process described with reference to FIG. 13 has been executed.

It is assumed that the process rule notification message has reached the transfer device 40c as indicated by an arrow A21. The process rule notification message that has reached the transfer device 40c as indicated by the arrow A21 is transmitted in the arrow A13 of FIG. 13. However, since the process rule notification message has been transferred on the path including the congested point 7, a transmission delay is assumed to be large. Information indicating that a packet having a transmission source MAC address and a destination MAC address, which are respectively the address of the communication device 2a and that of the communication device 2b, is output from port F is assumed to be recorded in the process rule notification message addressed to the transfer device 40c. The request control unit 52c of the transfer device 40c updates the flow table 61c by using the process rule notification message.

FIG. 16 illustrates examples of the flow table. With the process of the request control unit 52c, the flow table 61c-1 (FIG. 14) is updated to the flow table 61c-2 illustrated in FIG. 16. Since the transfer devices 40a, 40b and 40d have not received a new process rule notification message after the process indicated by the arrow A13 of FIG. 13 was executed, the flow table 61 is not updated in the transfer devices 40a, 40b and 40d.

In the transfer device 40c, the request control unit 52c notifies the processing unit 55c that the flow table 61c has been updated. The processing unit 55c searches the flow table 61c-2 after being updated for the process rule applicable to the packet P22 stored in the packet holding unit 63c. As illustrated in FIG. 16, the second entry of the flow table 61c-2 is applicable to the packet P22. Therefore, the processing unit 55c transmits the packet P22 from port F by using the transmitter 42c (arrow A22 of FIG. 15).

With the process indicated by the arrow A22, the packet P22 reaches the transfer device 40d. The searching unit 53d of the transfer device 40d processes the packet P22 by using the flow table 61d-1 (FIG. 16). Accordingly, the packet P22 is transmitted from port H on the basis of the second entry of the flow table 61d-1 (arrow A23). The transfer device 40d transmits the packet P22 from port H, so that the packet P22 is transferred from the transfer device 40d to the communication device 2b.

When a process rule applicable to a packet held by the packet holding unit 63 is not obtained during a specified waiting time period, the request control unit 52c may issue a request for a process rule to the control device 10. Moreover, when the process rule applicable to the packet within the packet holding unit 63c is not obtained even after the processing unit 55c is notified of a change of the flow table 61c, the processing unit 55c notifies the request control unit 52c that the process rule has not been successfully obtained. When the request control unit 52c is notified from the processing unit 55c that the process rule has not been successfully obtained, the request control unit 52c continues to monitor whether the process rule can be obtained during the waiting time period.

As described above, when the transfer device 40c receives, from a different transfer device, the packet P22 for which a process content is not notified, it determines that the process rule can possibly be notified from the control device 10. The request control unit 52c does not make an inquiry about the process of the received packet to the control device 10 until a specified time period elapses. Therefore, there is a low possibility that processes such as a decision, a notification and the like of a process rule for a packet on the same condition are redundantly executed in the control device 10. Thus, the processing load on the control device 10 is reduced. Moreover, communication between the control device 10 and the transfer device 40c is not performed, whereby congestion within a network can be prevented from becoming worse.

FIG. 17 is a flowchart for explaining an example of the process executed by the transfer device 40. The transfer device 40 waits ("NO" in step S11) until it receives a packet. When the transfer device 40 has received a packet, the searching unit 53 searches the flow table 61 for a process rule applicable to the received packet ("YES" in step S11; step S12). The searching unit 53 determines whether a process rule applicable to the received packet can be obtained from the flow table 61 (step S13). When a process rule applicable to the received packet can be obtained, the searching unit 53 notifies the processing unit 55 of the obtained process rule ("YES" in step S13). The processing unit 55 processes the received packet in accordance with the obtained process rule (step S14). In contrast, when a process rule applicable to the received packet is not obtained, the searching unit 53 outputs the received packet to the request control unit 52 along with information of a reception port ("NO" in step S13). The request control unit 52 determines, by using the port information table 62, whether the notified reception port is connected to a different transfer device 40 (step S15).

When the reception port of the packet is connected to a different transfer device 40, the request control unit 52 holds the received packet in the packet holding unit 63, and activates a timer after it sets the timer to a length of time applied as a waiting time period ("YES" in step S15, step S16). Here, the set value of the timer is a value decided on the basis of the length of a transfer delay that occurs in communication between the control device 10 and the transfer device 40. For example, an average value of a transfer delay, a maximum length of time used for communication between the control device 10 and the transfer device 40, or the like, can be used as the set value of the timer. In the examples illustrated in FIGS. 17 and 18 the timer represents whether the waiting time period of the transfer device 40 has elapsed by counting down from the set value.

Meanwhile, when the reception port of the packet is not connected to a different transfer device 40, the request control unit 52 transmits, to the control device 10, a request message for issuing a request for a process rule applicable to the received packet ("NO" in step S15, step S17).

Figure 18:
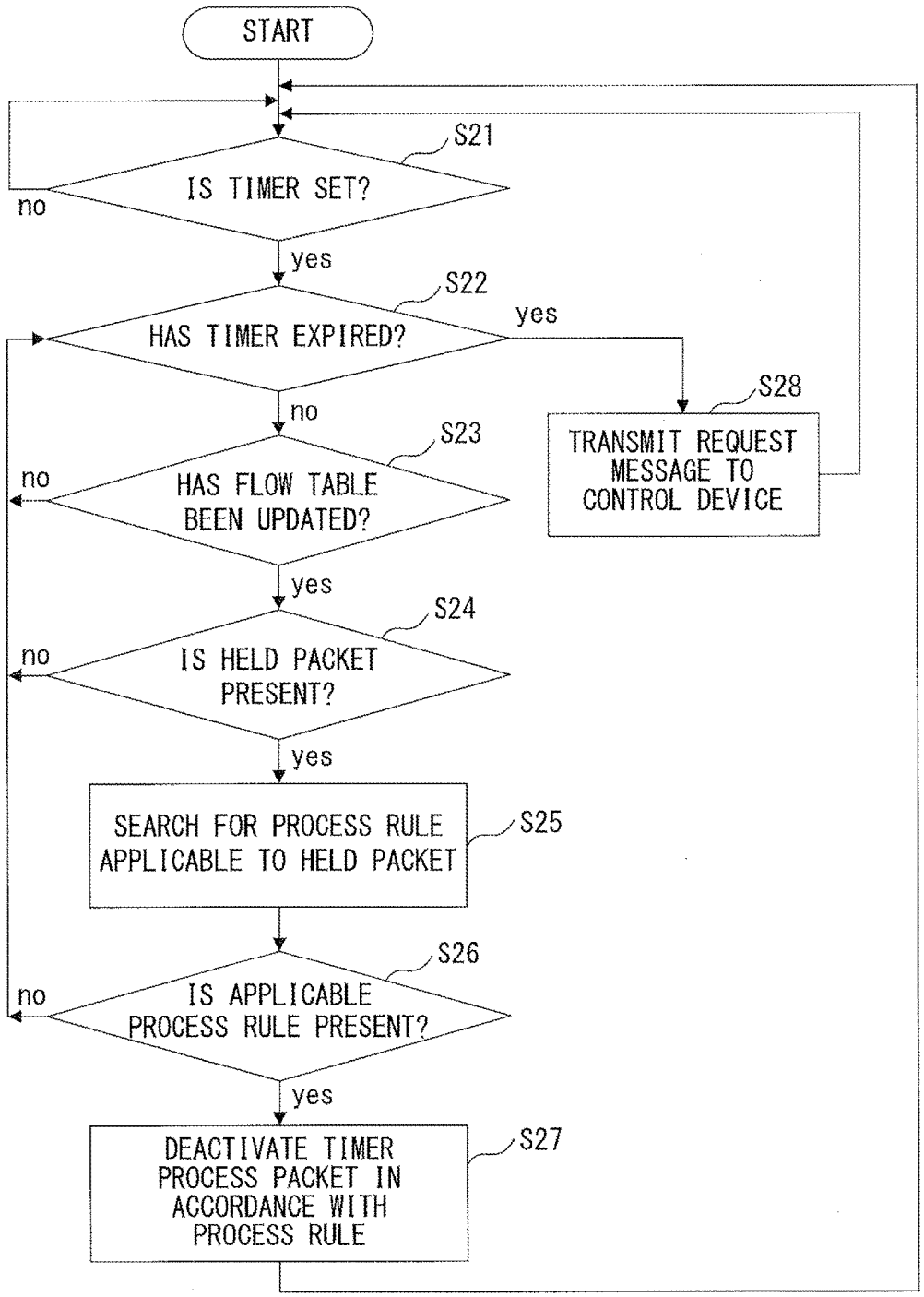
FIG. 18 is a flowchart for explaining an example of a process executed by the transfer device.

FIG. 18 is a flowchart for explaining an example of the process executed by the transfer device 40. The request control unit 52 waits ("NO" in step S21) until the timer is set. When the timer is set, the request control unit 52 determines whether the count-down from the set value is completed ("YES" in step S21; step S22). When the count-down from the set value is not completed, the request control unit 52 determines whether the flow table 61 has been updated ("NO" in step S22; step S23). When the flow table 61 has been updated, the processing unit 55 determines whether a packet is held in the packet holding unit 63 ("YES" in step S23; step S24). When a packet is held in the packet holding unit 63, the processing unit 55 searches the flow table 61 for a process rule applicable to the packet within the packet holding unit 63 ("YES" in step S24; step S25). The processing unit 55 determines whether a process rule applicable to the packet within the packet holding unit 63 has been obtained (step S26). When a process rule applicable to the packet held in the packet holding unit 63 has been obtained, the processing unit 55 processes the packet by using the obtained process rule, and initializes the timer ("YES" in step S26; step S27). Thereafter, the process in and after S21 is repeated.

When it is determined that the flow table 61 has not been updated in step S23 or that the packet is not held in the packet holding unit 63 in step S24, the process in and after step S22 is repeated. Moreover, when the processing unit 55 has not obtained a process rule applicable to the packet held in the packet holding unit 63 from the flow table 61 in step S26, the flow returns to step S22.

Additionally, when the count-down of the timer is completed in step S22, the request control unit 52 transmits, to the control device 10, a request message for issuing a request for the process rule applicable to the packet held in the packet holding unit 63 (step S28).

Second Embodiment

The first embodiment refers to a case where a single control device 10 is present within a network. However, in a network including arbitrary numbers of control devices 10 and transfer devices 40, the number of times that a request message is transmitted can be reduced, lightening the processing load on the control devices 10.

Figure 19:
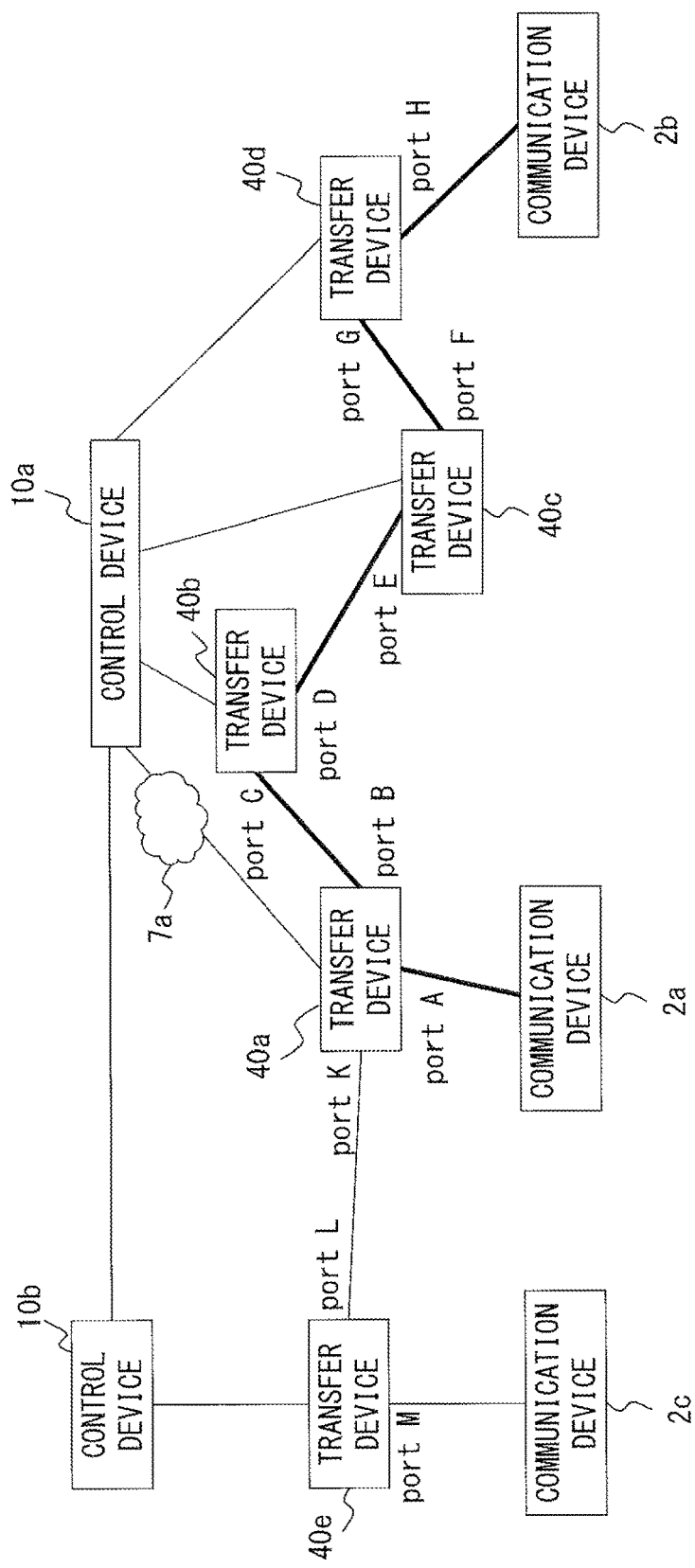
FIG. 19 is an explanatory diagram of an example of control performed in a second embodiment.

FIG. 19 is an explanatory diagram of an example of control performed in a second embodiment. In the example illustrated in FIG. 19, the network includes control devices 10*a* and 10*b*. It is assumed that path information obtained with a calculation, a control message, and the like, can be transmitted and received between the control devices 10*a* and 10*b* if needed. It is also assumed that transfer devices 40*a* to 40*d* are transfer devices that are controlled by the control device 10*a*, and a transfer device 40*e* is a transfer device that is controlled by the control device 10*b*. It is further assumed that each of the transfer devices 40 is set to transmit a Packet_In message including an LLDP packet to the control device 10 with which the corresponding transfer device 40 communicates.

The control devices 10*a* and 10*b* transmit a Packet_Out message for issuing a request to transmit an LLDP packet to a subordinate transfer device 40 with a process similar to that of the first embodiment in order to identify a topology of a network. In the second embodiment, the Packet_In message is transmitted and received between the control devices 10, so that the control devices 10 can also identify a topology of a port connected to the transfer device 40 subordinate to the other control device 10. Assume that the control device 10*a* has transmitted, to the transfer device 40*a*, a Packet_Out message including the following information in order to cause the transfer device 40*a* to transmit the LLDP packet from port K.

Destination IP address: address of transfer device 40*a*
Message type: Packet_Out
Output port information: port K
Chassis ID within LLDP packet: transfer device 40*a*
Port ID within LLDP packet: port K The transfer device 40*a* transmits the LLDP packet from port K with a process similar to that of the first embodiment. Thus, the transfer device 40*e* receives, via port L, the LLDP packet transmitted from port K of the transfer device 40*a*. Then, the transfer device 40*e* transmits, to the control device 10*b*, a Packet_In message including the following information.

Transmission source IP address: address of transfer device 40*e*
Destination IP address: address of control device 10*b*
Message type: Packet_In
Reception port information: port L
Chassis ID within LLDP packet: transfer device 40*a*
Port ID within LLDP packet: port K When the chassis ID included in the LLDP packet of the received Packet_In message is not the ID of the subordinate transfer device 40, the control device 10*b* transfers the Packet_In message to the control device 10*a*. Accordingly, the topology detection unit 21 of the control device 10*a* can identify that port K of the transfer device 40*a* is connected to port L of the transfer device 40*e*. Accordingly, in the example of FIG. 19, the port attribute notification unit 22*a* of the control device 10*a* notifies the transfer device 40*a* that port B and port K are connected to the different transfer devices 40.

When a path including the transfer device 40 controlled by a different control device 10 is set, the control device 10 that controls the transfer device 40 connected to the communication device 2 at a transmission source of a packet calculates the entire path, and notifies the different control device 10 of the calculated path. Thus, it is assumed that each of the control devices 10 notifies the subordinate transfer devices 40 of a process rule for both the path obtained with the calculation and that notified from the other control device 10.

For example, when the communication device 2*c* transmits a packet to the communication device 2*b*, the transfer device 40*e* that has received the packet from the communication device 2*c* issues a request for the process rule by transmitting a request message including the packet to the control device 10*b*. Then, the process rule decision unit 23*b* of the control device 10*b* calculates a path on which the packet is transferred sequentially to the transfer device 40*e*, the transfer device 40*a*, the transfer device 40*b*, the transfer device 40*c*, the transfer device 40*d* and the communication device 2*b*. The process rule decision unit 23*b* notifies the transfer device 40*e* of a transmission, from port L, of the packet transmitted from the communication device 2*c* to the communication device 2*b* as a process rule, and also notifies the control device 10a of information about the different transfer device 40. The control device 10a notifies the transfer devices 40a to 40d of the process rule in accordance with the notification from the control device 10b.

Here, it is assumed that a considerable amount of time is used for communication between the control device 10a and the transfer device 40a due to a congested point 7a. Thus, it is assumed that the transfer device 40a has received the packet transmitted from the communication device 2c to the communication device 2b before it receives the process rule from the control device 10a.

The searching unit 53a of the transfer device 40a notifies the request control unit 52a that the process rule applicable to the received packet is not obtained from the flow table 61a. Since the reception port of the packet is port K, which is connected to a different transfer device 40, the request control unit 52a determines that the process rule can possibly be notified without transmitting a request message to the control device 10a. Accordingly, similarly to the first embodiment, the request control unit 52a does not transmit the request message to the control device 10a until a specified time period elapses. Moreover, when the process rule applicable to the received packet is notified before the request message is transmitted, the processing unit 55a of the transfer device 40a processes the received packet by using the notified process rule.

As described above, similarly to the first embodiment, whether each of transfer devices 40 is to transmit a request message can be decided in accordance with a type of a device connected to a reception port even in a network where the transfer devices 40 are managed by a plurality of control devices. Accordingly, similarly to the first embodiment, the second embodiment reduces the possibility that processes such as a decision and a notification of a process rule for a packet on the same condition are executed redundantly in the control device 10, whereby the processing load on the control device 10 can be lightened. Also congestion within a network can be prevented from becoming worse.

As described above, the processing load on the control device can be lightened in both embodiments.

Modification Example

The above described embodiments may be modified so that a packet received from a different transfer device 40 can be discarded when the transfer device 40 has not received a process rule during a waiting time period. In this case, when the process rule is unknown for a packet other than the packet received from the different transfer device 40, each transfer device 40 makes an inquiry to the control device 10 about the process rule. When the transfer device 40 does not obtain the process rule for the packet received from the different transfer device 40 during a specified time period, heavy congestion can possibly occur on a path extending from the transfer device 40 that is going to make an inquiry about the process rule to the control device 10. Accordingly, when the process rule is not be obtained during the specified time period, the transfer device 40 discards the received packet without communicating with the control device 10. As a result, congestion within the network can be prevented from becoming worse.

When a plurality of control devices 10 within a network are managed by different administrators, a Packet_In message does not need to be shared among the control devices 10. When the Packet_In message is not shared between the control device 10a and the control device 10b in FIG. 19, the control device 10a does not identify the device connected to port K of the transfer device 40a. Accordingly, when the process rule for the packet received from port K is not present, the transfer device 40a issues a request for the process rule to the control device 10a.

The above-described formats of packets and control messages, and the information items included in the tables, are merely examples, and may be changed in accordance with an implementation.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A transfer device that operates within a network including a plurality of transfer devices and a control device, the transfer device comprising:
   a processor; and
   a network connecting device that receives a packet, wherein
   when a packet received from any of the plurality of transfer devices does not satisfy a process condition notified from the control device, the processor performs control such that a request message is transmitted after a specified time period elapses from reception of the received packet, the specified time period being set by the processor based on an average delay time of transfer delays that occur in communications with the control device,
   the request message is a message for requesting the control device to notify the transfer device of a process applicable to the received packet, and
   when process information, which is information representing the process applicable to the received packet, has been obtained from the control device before transmitting the request message, the processor processes the received packet in accordance with the obtained process information without transmitting the request message.

2. The transfer device according to claim 1, further comprising
   a plurality of ports, wherein
   the processor extracts, from a packet received from the control device, connection information indicating to which of the plurality of transfer devices each of the plurality of ports is connected, and
   the processor determines that the received packet has been received from one of the plurality of transfer devices when the connection information indicates that a port at which the received packet has been received is connected to the one of the plurality of transfer devices.

3. The transfer device according to claim 1, wherein
   the processor transmits a request message for requesting the process information to the control device via the network connecting device, when the processor has not obtained the process information by the time the specified time period elapses.

4. The transfer device according to claim 1, wherein
   the processor transmits, to the control device via the network connecting device, a different request message for issuing a request to notify the transfer device of content of a process for a target packet, the target packet has been received from a port connected to none of the plurality of transfer devices and does not satisfy the received process condition, and the processor uses information notified from the control device in response to the different request message as a process for the target packet.

5. A control device that controls a transfer process executed by a plurality of transfer devices, the control device comprising:

a processor; and a network connecting device that transmits and receives a message, wherein the processor executes a process for notifying each of the plurality of transfer devices of connection information indicating whether each port possessed by each of the plurality of transfer devices is connected to another transfer device among the plurality of transfer devices, the network connecting device receives a request message from one of the plurality of transfer devices that has obtained a packet via a port connected to a different device which is different from any one of the plurality of transfer devices, the request message requests process information indicating a processing method of the obtained packet, the processor decides the process information for the obtained packet, the decided process information includes information identifying a transmission source and a destination of a target packet of the processing method, and the network connecting device transmits to the plurality of transfer devices a plurality of notification messages each of which includes the decided process information for the obtained packet and information identifying an output port of each of the plurality of transfer devices, the target packet being output from the output port, each of the plurality of transmitted notification messages being received by each of the plurality of transfer devices directly from the control device without an intervention of others of the plurality of transfer devices.

6. A communication method executed in a network where a control device decides a process of a packet in a plurality of transfer devices, the communication method comprising:

notifying, by the control device, a first transfer device of a port connected to a second transfer device within the first transfer device;

receiving, by the first transfer device, a packet from the second transfer device via the port;

when the first transfer device does not possess information representing the process applicable to the received packet, performing, by the first transfer device, control such that a request message is transmitted after a specified time period elapses from reception of the received packet, the request message being a message for requesting the control device to notify the first transfer device of a process applicable to the received packet, the specified time period being set by the transfer device based on an average delay time of transfer delays that occur in communications with the control device; and when the first transfer device has obtained process information representing the process applicable to the received packet from the control device before transmitting the request message, processing, by the first transfer device, the received packet in accordance with the obtained process information without transmitting the request message.

* * * * *